L. SCHULTHEIS.
LUBRICATOR FOR THE GUIDE RAILS OF ELEVATORS.
APPLICATION FILED APR. 8, 1911.
1,027,909.
Patented May 28, 1912.
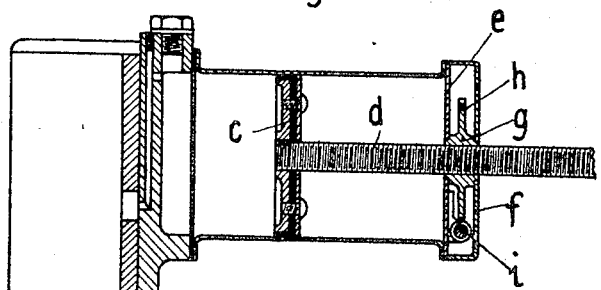
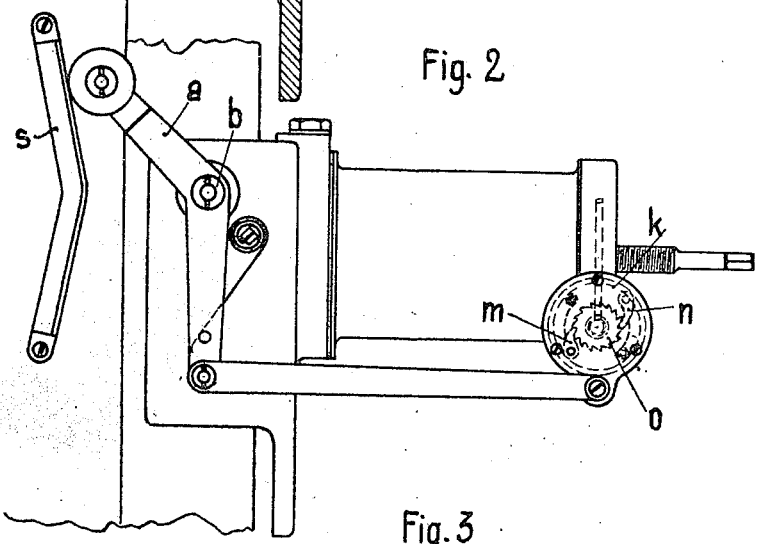
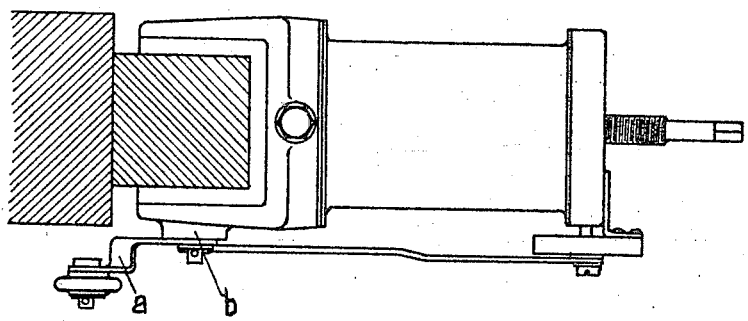
Witnesses
J. Austin Stone
M. Ethel Lyons
Inventor
Ludwig Schultheis
By his Attorney

UNITED STATES PATENT OFFICE.

LUDWIG SCHULTHEIS, OF FRANKFORT-ON-THE-MAIN, GERMANY, ASSIGNOR TO OTTO WETZEL & COMPANY, OF HEIDELBERG, GERMANY, A FIRM.

LUBRICATOR FOR THE GUIDE-RAILS OF ELEVATORS.

1,027,909.

Specification of Letters Patent. Patented May 28, 1912.

Application filed April 8, 1911. Serial No. 619,881.

*To all whom it may concern:*

Be it known that I, LUDWIG SCHULTHEIS, a citizen of the German Empire, residing at Frankfort-on-the-Main, in the Province of Hesse-Nassau and Empire of Germany, have invented certain new and useful Improvements in Lubricators for the Guide-Rails of Elevators, of which the following is a specification.

This invention relates to lubricating devices for the guide rails of elevators, conveyers, and similar apparatus and in which the piston of a lubricant press is moved forward under the influence of levers and transmission gearing actuated by projections on the rails or the supporting frame-work.

The objects of the present improvements are to simplify the operating mechanism and to effectually protect that mechanism against influences which interfere with its successful operation.

In the annexed drawings, Figure 1 is a longitudinal section of the lubricant press or container, Fig. 2 is a side elevation of the same, showing a portion of the guide rail or frame in connection therewith, Fig. 3 is a top plan view with the guide rail in section.

The lubricant employed is generally of a thick heavy nature and contained in a cylinder which is carried by the elevator or other moving member and provided at one end with a shoe engaging the guide rail. A spring-pressed angle lever $a$ is pivoted at $b$ on the side of the shoe and its upper end projects normally beyond the shoe to engage a cam or projection $s$ on the supporting frame so that as the car passes the projection the lever will be vibrated and the mechanism operated to feed the lubricant through the shoe to the guide rail. Within the lubricant-containing cylinder is an ejecting piston or plunger $c$ from which extends a worm $d$. A transverse partition $e$ extends across the cylinder, adjacent the rear end of the same, and the worm or piston rod $d$ is slidably mounted in this partition and the cap $f$ forming the end of the cylinder. A worm wheel $h$ is mounted between the partition and the cap $f$, the hub $g$ of this wheel forming an internal worm or nut engaging the worm $d$ and said wheel and nut being held against lateral movement by the partition and the cap.

Arranged below the worm wheel $h$ and meshing therewith is a worm shaft $i$ which extends laterally from the cylinder and has a ratchet wheel $o$ fast on its outer end. This ratchet wheel is inclosed by a two-part cylindrical casing, the inner member of the casing being rigidly supported on the lubricant press or cylinder, through a convenient bracket, and the outer member forming a lid-like closure or cover for the inner member. The outer member is connected with the lower end of the lever $a$ by a suitable link so that the vibration of said lever will cause a corresponding movement of the said member and the pawls $m$, $n$, carried internally by the member, will then engage the ratchet wheel $o$ and actuate the same to effect rotation of the shaft $i$. The shaft $i$ being in direct engagement with the wheel $h$, will rotate the same and, as a result, the piston rod $d$ will be caused to travel longitudinally and carry the piston $c$ toward the shoe, thereby expressing a portion of the lubricant through the passages of the shoe to the guide rail.

It will be noted that the cam or trip is arranged parallel with the plane of the elevator shaft or well and projects toward the said shaft while the lever is arranged in the same plane and, consequently, works parallel with the side of the shoe instead of at an angle thereto. As a result of this arrangement, the lever will be actuated positively and directly, even when the apparatus is operated at high speed, without creating any lateral or torsional strain on its bearing. The movement of the lever is transmitted to the piston more directly than heretofore so that the number of parts necessary for the operation of the device is reduced and the frictional resistance is to a large degree eliminated. The direct transmission of the actuating impulse is advantageous inasmuch as it is desirable to mount the lubricant container directly upon the shoe and in a horizontal position so that an outlet arranged at the highest point will permit the lubricant to pass directly to the shoe, whether the lubricant be a liquid or some substance having greater consistency, and less power will be required to force the lubricant evenly from the container. The parts of the device, according to my present invention are arranged in a very compact manner so that space is economized and it may be installed in very restricted shafts.

Furthermore, as the pawl and ratchet members of the gearing are inclosed and are spaced from the lubricant press or cylinder, they are always clean and in operative condition. These parts of the gearing are necessarily small and delicate and in previously known arrangements frequently became clogged and failed to work because some of the lubricant leaked from the press onto the pawls and ratchet.

Having thus described my invention, what I claim and desire to secure by Letters Patent is:—

1. In a device for the purpose set forth, the combination with a track, of a lubricant container mounted to travel over the track, mechanism at the end of the container for effecting a discharge of lubricant including an oscillatory member, a lever mounted adjacent the track and traveling with the lubricant container, and operating in a plane parallel with the line of travel of the container, a connection between said lever and said oscillatory member, and a trip on the track in the path of the lever and lying in the same plane therewith.

2. In a device for the purpose set forth, the combination with a track, and a shoe traveling thereon, of a lubricant container mounted directly on said shoe, a piston in said container, mechanism at the end of the container for moving the piston toward the shoe including an oscillatory member, a lever mounted on the side of the shoe and operating in a plane parallel therewith, a connection between said lever and said oscillatory member, and a trip on the track in the path of the lever and lying in the same plane therewith.

Dated this 27th day of March 1911.

In testimony whereof I affix my signature, in presence of two witnesses.

LUDWIG SCHULTHEIS.

Witnesses:
 FRIEDRICH CARL WENTZEL,
 MAX DEUTSCHER.